INVENTOR.
Frank H. Highley
BY
Donald P. Selwiski
His Attorney

United States Patent Office 3,263,428
Patented August 2, 1966

3,263,428
BRAKE PEDAL RATIO CHANGER
Frank H. Highley, Franklin, Mich., assignor to General Motors Corporation, Detroit, Mich., a corporation of Delaware
Filed Feb. 4, 1965, Ser. No. 430,365
8 Claims. (Cl. 60—60)

This invention relates to brake mechanisms and more particularly to a device for use with power brakes to vary the mechanical advantage of brake actuators when there is a power loss in the power braking mechanism.

Power braking mechanisms of common design, especially vacuum suspended types, require very little movement for their operation. Consequently, brake pedals normally used with this type power booster are suspended very near the toe board in a vehicle driving compartment. This positioning of the brake pedal tends to eliminate clutter in the driving compartment and, hence, is advantageous from the safety standpoint. It is desirable therefore to have a brake pedal with a given ratio for powered operation and with an increased ratio for unpowered operation.

It is an object of the present invention to provide an improved brake actuating mechanism which automatically provides a higher pedal ratio for unpowered operation.

It is another object of the present invention to provide an improved brake actuating mechanism which senses a loss of power in a booster mechanism to increase the mechanical advantage of brake actuating levers.

It is still another object of the present invention to provide a device which senses a loss of vacuum in a vacuum suspended power booster and which responds by mechanically positioning an element in the brake actuating linkage to provide a higher mechanical advantage for unpowered operation thereof.

Further objects and advantages of the present invention will be apparent from the following description, reference being had to the accompanying drawings wherein a preferred embodiment of the present invention is clearly shown.

Figure 1:
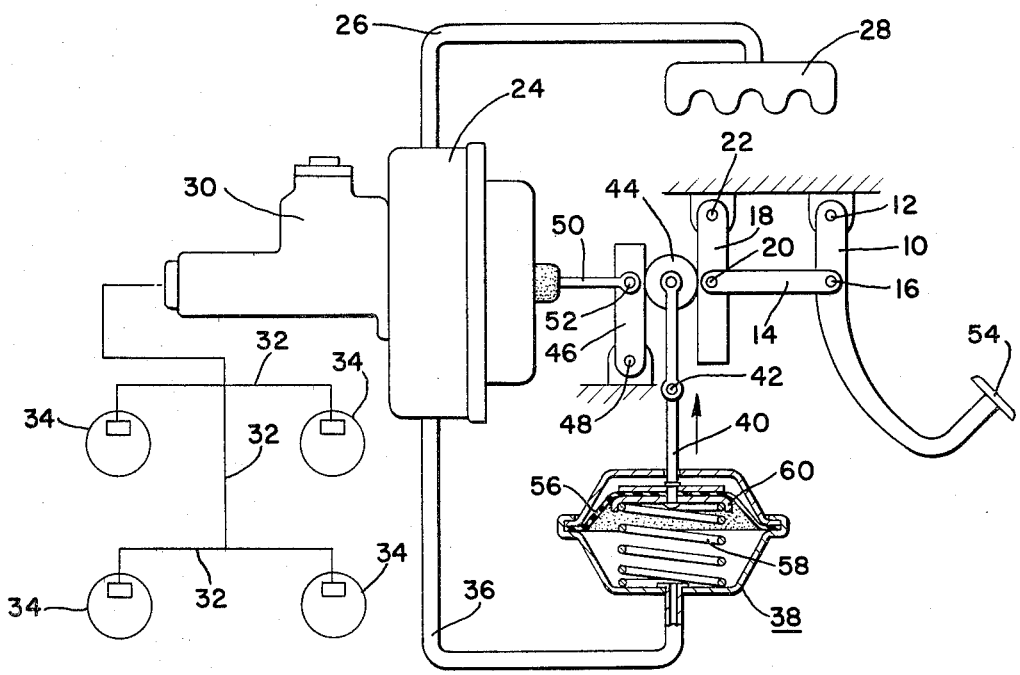
FIGURE 1 is an elevational view of the subject invention shown in a diagrammatic illustration of a typical vehicle braking system.

Referring now to FIGURE 1 a brake pedal 10 is pivotally supported at pivot point 12 formed as a fixed portion of a vehicle. A pivot link 14 engages the pedal at pivot point 16 and an auxiliary lever 18 at point 20. The auxiliary lever 18 is pivotally supported at pivot point 22 formed as a fixed portion of the vehicle. The spacing of points 12 and 22 is equal to the space between points 16 and 20 thereby allowing movement of the pedal 10 to be duplicated in lever 18.

A brake booster 24, for example, a vacuum suspended booster, communicates through a line 26 with an intake manifold 28 of a vehicle engine, not shown, and is negatively pressurized thereby. The booster 24 typically provides a power boost for actuation of an hydraulic master cylinder 30 in any well-known manner which results in the pressurization of lines 32 and, consequently, the application of brakes on vehicle wheels 34. Vacuum is communicated through line 36 to a vacuum actuator, generally designated by the numeral 38. An output arm 40 of the vacuum actuator 38 is pivoted at point 42 and carries a rotatably disposed roller 44 at another extremity.

Pivot link 46 is pivotally carried at point 48 formed as a fixed portion of the vehicle and also pivotally engages a booster input member 50 at point 52. As seen in FIGURE 1, the roller 44 forms a force transmitting link between pivot link 14 and the input member 50. As seen in FIGURE 1, the subject invention provides a direct force transmission between the pedal 10 and the input member 50. Therefore, whatever mechanical advantage is derived from the relative positioning of point 12, point 16 and a pad 54 of the brake pedal 10 is directly transmitted to the booster 24. It should be noted that the parts in FIGURE 1 are shown in the position they would assume under conditions of no power being present in the booster 24.

The vacuum actuator 38 is a conventional type wherein a diaphragm 56 is biased in the direction shown by the arrow in FIGURE 1 by a diaphragm spring 58. Spring retainer 60 serves the dual function of centering the spring 58 and supporting the output arm 40.

Figure 2:
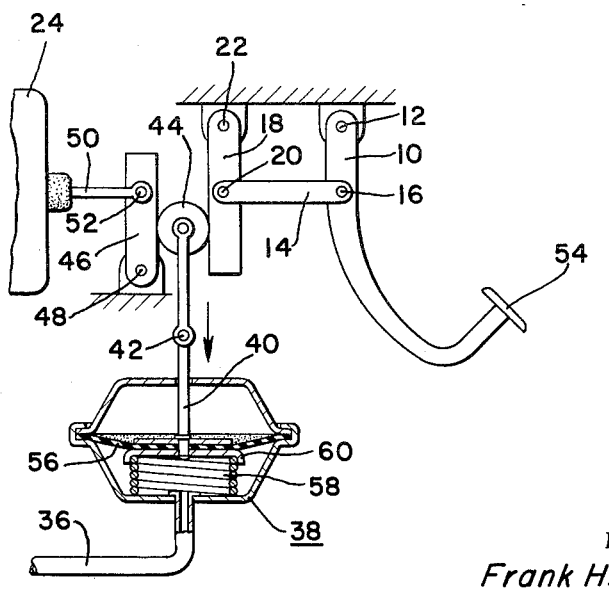
FIGURE 2 is an elevational view of the subject invention with the invention shown in another operative position.

In operation, with vacuum being supplied the booster 24 from the intake manifold 28, the parts of the invention assume a configuration as shown in FIGURE 2. In FIGURE 2, vacuum supplied through line 36 from the booster 24 negatively pressures the vacuum actuator 38 causing the spring 58 to be compressed. The output arm 40 is therefore drawn in the direction of the arrow 42 and causes the roller 44 to be drawn below a line passing through the longitudinal axis of the input member 50 and pivot link 14. While in this position, any movement of the brake pedal 10 is transmitted through the link 14 to the lever 18, the roller 44, the link 46 to the input member 50. It is obvious that the mechanical advantage is something less than that available with a direct drive between the link 14 and the input member 50. This is due primarily to the fact that force is transmitted through lever 18 and link 46 at some point removed from the direct drive position, it being understood that the lever 18 and link 46 are reversely positioned relative to the link 14 thereby cancelling out any possible mechanical advantage available through the levers alone. In a configuration shown in FIGURE 2, the input member 50 is movable by the pedal 10 in the aforementioned manner and it brings about a brake actuation in a conventional manner.

Referring to FIGURE 1, the parts of the invention are shown in a configuration they would assume under unpowered conditions of operation. Vacuum in the line 26 from the booster 24 is lost and, consequently, spring 58 becomes dominant and the actuator 38 pushes the output arm 40 in the direction of the arrow. This causes the roller 44 to be positioned on a line passing through the longitudinal axis of the input member 50 and the pivot link 14. Therefore, effective direct force transmission is available from the pedal 10 to the input member 50. It is understood that a mechanical advantage and effective force increase takes place in the pivotal mounting of the brake pedal 10 and this increased leverage is able to be utilized at a one-to-one ratio by the input member 50. Therefore, when the mechanism shown in unpowered, pedal 10 can be pressured to displace fluid in the master cylinder 30 in a conventional manner thereby providing a force for brake actuation.

It is clear from an examination of FIGURE 1 that the link 14 and lever 18 can be eliminated with force being directly transmitted to the roller 44 from the pedal 10. Link 14 and lever 18 have been shown to illustrate a preferred embodiment wherein certain clearance between the brake pedal 10 and the operative portions of the brake mechanism are desirable.

In summary, the invention exists in providing mechanism which is adapted to move an input arm of a power booster through a lever arrangement offering a relatively low mechanical advantage. This relatively low mechanical advantage is acceptable, as previously stated, because of the small power requirement requisite for power boosters. This relatively low mechanical advantage can be converted into a much more favorable mechanical advantage without moving the brake pedal during times of power failure to allow actuation of the brake system in an improved manner.

The actuator mechanism shown in this invention is extremely inexpensive and can very readily be incorporated into braking systems of common design. The absence of sophisticated structure and many moving parts makes the described invention particularly suitable for use with high production vehicles. The added advantage of maintaining the brake pedal at a fixed position for powered and unpowered operation adds to the utility of the subject mechanism.

While the embodiment of the present invention, as herein disclosed, constitutes a preferred form, it is to be understood that other forms might be adopted.

What is claimed is as follows:

1. Vehicle brake actuating mechanism comprising: power source means carried by a vehicle; power operable means including an input member, said power operable means being in force communication with said power source means and vehicle brakes; actuator means pivotally supported by the vehicle and having an output member; and force transmitting means including an actuator responsive to a force in said power operable means and an element adapted to be positioned to a plurality of force transmitting positions between the input member of said power operable means and the output member of said actuator means, said element and said actuator being responsive to a force in said power operable means to increase and decrease the ratio of said actuator means for brake actuation as required under various operating conditions.

2. Vehicle brake actuating mechanism comprising: a vacuum pressure source carried by a vehicle; vacuum booster means in pressure communication with said vacuum pressure source and arranged to assist in the actuation of vehicle brakes, said vacuum booster means including an input member; an actuator pedal pivotally supported by the vehicle and having an output member arranged in force transmitting relationship with said vacuum booster means for actuation thereof; a vacuum actuator communicating with said vacuum booster means and responsive to pressure therein; and slidable means carried by said vacuum actuator and shiftable to a plurality of positions relative to the input member of said vacuum booster means and the output member of said actuator pedal in response to pressure changes in said vacuum booster means whereby the transmission of force from the actuator pedal varies between direct force transmission and a decreased ratio transmission.

3. Vehicle brake actuating mechanism according to claim 2 wherein the vacuum booster means is a vacuum suspended power booster unit drawing vacuum pressure from the intake manifold of the vehicle engine.

4. Vehicle brake actuating mechanism according to claim 2 wherein the slidable means is an element pivotally carried by the vacuum actuator and a friction reducing means carried by said element, said friction reducing means being a force transmitting link between said actuator pedal output member and the input member of said vacuum booster means.

5. Vehicle braking mechanism according to claim 4 wherein the friction reducing means is a roller rotatably carried by the element of the slidable means.

6. Vehicle braking mechanism comprising: a pressure source carried by a vehicle; pressure booster means for vehicle brakes in fluid communication with said pressure source, said pressure booster means having a pivotable input member; a pressure responsive device in fluid communication with said pressure booster means and being arranged to generate a linear movement upon pressure changes in said pressure booster means; an output member carried by said pressure responsive device and being linearly movable in response to pressure changes therein, said output member including a rotatable element carried on an end thereof opposite the pressure responsive device; and an actuator pedal including an output member pivotally supported in substantial alignment with the input member of said pressure booster means and being pivotally supported by the vehicle, said output member arranged to move linearly towards said pressure booster means to provide an energizing force therefor, said rotatable element of said pressure responsive device being situated and linearly movable on a plane defined by a line placed perpendicular to the end of the actuator pedal output member and the input member of said pressure booster means, said rotatable element being movable to a plurality of positions on the plane to transmit a force from said actuator pedal to said pressure booster means with a mechanical advantage proportional to the pressure in said pressure booster means.

7. The vehicle braking mechanism according to claim 6 wherein the mechanical advantage made available for operation of said pressure booster means is at least 1:1 when no pressure is had in the pressure booster means.

8. The vehicle braking mechanism according to claim 6 wherein said pressure booster means is supplied vacuum from the vehicle engine and the pressure responsive device is a vacuum actuator.

References Cited by the Examiner

UNITED STATES PATENTS

| | | | |
|---|---|---|---|
| 1,993,544 | 3/1935 | Fleischel | 74—336.5 |
| 2,755,891 | 7/1956 | Levell et al. | 60—54.6 X |
| 2,836,265 | 5/1958 | Ingres | 188—152.44 |

EDGAR W. GEOGHEGAN, *Primary Examiner.*